United States Patent [19]
Cox et al.

[11] 3,879,566
[45] Apr. 22, 1975

[54] PROCESS FOR PREPARING A QUICK-COOKING RICE

[75] Inventors: James Patrick Cox; Jeanne Marie Cox, both of Coquitlam, British Columbia, Canada

[73] Assignee: Martin, Robertson & Bain Ltd., Vancouver, British Columbia, Canada

[22] Filed: Apr. 5, 1971

[21] Appl. No.: 131,423

[52] U.S. Cl. ............... 426/309; 426/93; 426/205; 426/323; 426/352; 426/455; 426/462
[51] Int. Cl. .................................... A23c 1/00
[58] Field of Search .......... 426/289, 291, 292, 309, 426/328, 352, 419, 443, 460, 506, 331, 321, 93; 426/199, 461, 462; 99/80, 83

[56] References Cited
UNITED STATES PATENTS

| | | | |
|---|---|---|---|
| 2,951,812 | 9/1960 | Rapp | 55/35 |
| 3,157,514 | 11/1964 | Gorozpe | 426/461 |
| 3,467,528 | 9/1969 | D'Ercole et al. | 99/83 X |
| 3,523,025 | 8/1970 | McGinley | 99/83 |
| 3,526,511 | 9/1970 | Rockland | 99/80 PS |
| 3,582,352 | 6/1971 | Yasumatsu | 99/80 PS |
| 3,655,400 | 4/1972 | Cseri et al. | 99/80 PS |

OTHER PUBLICATIONS

"Rice Chemistry and Technology," edited by D. F. Houston and published by American Association of Cereal Chemists, Inc. St. Paul, Minn., 1972 Abstracts by Wasserman et al., on pages 140–142 and 164.

Smith et al., Agr. Exp. Station, Div. of Agr., Uni. of Arkansas, Fayetteville, Dec. 1959, Bulletin 619.

Smith et al., Univ. Arkansas Agr. Expt. Sta. Bull. 619 Fayetteville, Ark. 16 pp. (1959) Abstracts by Wasserman et al., in American Association of Cereal Chemists, Inc., St. Paul, Minn., 1972, pages 140–142, 164.

Hogan et al., Journal Agr. and Food Chemistry, Vol. 3, No. 10, Oct. 1955 pages 855–858.

Rose et al., "The Condensed Chemical Dictionary," 1966, Reinhold Publishing Corp., N.Y., pages 163, 859.

Primary Examiner—Raymond N. Jones
Attorney, Agent, or Firm—Robert W. Beach

[57] ABSTRACT

Various varieties of rice are subjected to heat treatment either by torrefaction in the presence of some water, by steaming, or by boiling, the water in each instance containing dissolved chemicals, for the purpose of modifying the protein content and the starch content to condition the product for subsequent accelerated water imbibation during final cooking for eating. After the heat and chemical treatment the rice product is rinsed to remove chemical residue and to eliminate clumping. The rice is then dried.

19 Claims, No Drawings

PROCESS FOR PREPARING A QUICK-COOKING RICE

A principal object of this invention is to provide a quick-cooking rice having whole grains which are strong and not fractured or mutilated, having good color both before and after cooking and having no objectionable odor or taste. Avoidance of mutilation of the rice grains minimizes loss of starch and nutrients during cooking and rinsing in the process of preparing the quick-cooking rice.

More specifically it is an object to produce such a quick-cooking rice which, before final cooking, looks like the usual commercial rice product, the grains of which will not be appreciably different in size from unmodified rice, which will have substantially the same characteristics of swelling as natural rice and, when finally cooked, will have odor, texture, taste and appearance very similar to ideally cooked conventional milled rice.

Still more specifically, it is an object to modify the protein component of the rice so that water will be more available to the starch component for imbibation, and to modify the starch component of the rice to increase its hydrophilic characteristics.

Another object is to accomplish the modification of the rice by heating and chemical treatment which can be performed by simple procedures and with simple equipment.

It is also an object to provide a process which can be used for treating various types and varieties of rice including long grain rice, short grain rice, pearl rice and brown rice, and which can be used to produce finally cooked rice having different physical qualities.

In processing the rice so that it will have quick-cooking characteristics it is an object to minimize loss of rice quantity as well as of various nutrient components of the rice itself.

A further object is to provide a rice product which can be prepared for eating by final cooking sufficiently quickly so that coatings carried by the rice grains to make special rice dishes, such as rice pudding, Chinese rice, curried rice, Italian rice, Spanish rice, rice with cheese sauce or rice with butter-type sauce, will not be overheated or overcooked.

Such quick-cooking rice can also be combined with other food components capable of being cooked in the same period of time as required for final cooking of the quick-cooking rice, such as spun soya protein chunks and dry beans in chili-rice, an alimentary paste product and bread chunks in dressing.

Another object is to deter loss of moisture from quick-cooking rice or from conventional milled rice to reduce weight loss during storage.

An additional object is to provide chemical treatment to facilitate the final cooking of quick-cooking rice for eating which will utilize chemicals that nutritionally fortify the rice product, particularly such chemicals that will increase its calcium, phosphorous and citrate content.

Various types of quick-cooking rice have been produced heretofore, but the theories followed in preparing such rice have been different from that of the present invention. By some processes the physical characteristics of the rice grains are altered, such as by fracturing them without disintegration in an effort to facilitate penetration of water into the interior of the grain for imbibation during final cooking. Such physical modification of rice grains detracts from the appearance of the rice, results in loss of nutrient values and is a comparatively expensive process to perform. Another proposal for preparation of quick-cooking rice is that of pregelatinization and expanded grain fixation, which process includes cooking rice at the factory to a condition of virtually complete gelatinization, followed by a drying operation by which a major portion of the imbibed water used for gelatinization is removed coupled with a puffing effect or an attempt to maintain the grains in expanded condition. The theory of such a pregelatinizing operation apparently is that after rice grains have once been expanded by gelatinization they will imbibe water more readily during the final cooking operation if the expanded condition produced can be retained. Such process requires the use of expensive equipment.

In preparing quick-cooking rice according to the present invention the rice grains are not subjected to mechanical action to modify their physical structure. Neither is reliance placed on bloating the rice grains followed by drying them in a manner to retain their expanded condition so as to facilitate subsequent water imbibation during final cooking. Instead, the present invention relies on molecular or internal structural modification of the rice grain chemical components accomplished by the use of chemicals and heat treatment to facilitate penetration of water into the rice grains and to expedite imbibation of the water during preparation of the quick-cooking rice and also during its final cooking to palatable condition.

In the textbook entitled, *Starch, Chemistry and Technology*, by Roy L. Whistler and Eugene F. Pascal, Vol. 2, Industrial Aspects, published in 1967 by Academic Press, Inc., at page 73, it is stated that, "Rice starch granules are bound into a rigid structure by proteins in close association with the starch (18). Chemical treatment is necessary to separate this protein fraction from the starch in the manufacturing process." Descriptions of various processes of manufacturing starch from rice then follow, all of which processes include the step of grinding the rice grains or physically disintegrating them in some fashion.

It is believed that the internal structure of a rice grain may include an integumental web formed by the protein component which sequesters the starch to deter imbibation of water by the starch to gelatinize it. Such theory could be responsible for the long time ordinarily required to cook rice in boiling water, for example. According to the present invention heat treatment of the rice with aqueous chemical apparently modifies the protein component and/or the starch component to facilitate penetration of water into the interior of the rice grains and to expedite imbibation of such water by the starch during gelatinization.

The heat treatment can be effected either by the rice being processed in hot, preferably boiling, water at atmospheric or higher pressure, or by the rice being steamed at atmospheric pressure or superatmospheric pressure, or by torrefaction of the rice in an autoclave in the presence of a small amount of water, or the rice can be subjected to a plurality of such heat treatment steps, either of the same type or of different types, in succession.

If the rice has been milled before being subjected to the process of the present invention, it is desirable, although not necessary, to rinse the rice initially in water, which preferably is warm, such as within the range of 85° F. to 95° F., to remove talc, glucose and free starch from its surface. The rinse water preferably is a mildly alkaline solution, such as being a solution of 0.001% of sodium bicarbonate having a pH of 7 to 8. Rinse water having a pH range of 5 to 9 can, however, be used. Rinse water having a pH of less than 6.8 will tend to produce a whiter product, whereas considerably higher pH will produce a yellow or greenish yellow tint. Rinse water having higher pH, such as above 7.5, will increase the hydrophilic character of the rice. Successive rinse waters can be used until the rinse water is clear.

The rinsing preferably should not be continued for more than 3 minutes to 5 minutes if the rice is to be subjected to dry steam heat treatment subsequently. Otherwise, the rice may remain in the rinse water for a considerable period of time, such as 10 minutes to 30 minutes, to increase the depth and uniformity of penetration of the water into the rice kernels. Such penetration reduces the tendency of the rice kernels to disintegrate or to become mutilated from the action of internal osmotic pressure acting to burst the rice grains during subsequent boiling, which results in starch being lost to the cooking water. A brief after-rinse in calcium chloride brine deters adhesion between grains which adhesion would cause mutilation if the grains were forced apart.

Heat treatment of the rice is effected in the presence of the aqueous chemical or chemical solution. An aqueous solution can be used which initially is either cold or hot. Such chemical may be alkali metal phosphate, i.e. phosphate of sodium or potassium including orthophosphates, pyrophosphates and metaphosphates. Specific examples are monosodium phosphate, $NaH_2PO_4$, disodium phosphate, $Na_2HPO_4$, sodium trimetaphosphate, $(NaPO_3)_3$, disodium dihydrogen pyrophosphate, $Na_2H_2P_2O_7$, and tetrasodium pyrophosphate, $Na_4P_2O_7$. It is believed that alkali metal phosphates act principally to modify the starch of the rice for increasing its hydrophilic character, but may also modify the protein of the rice to reduce its protection of the starch from water absorption. Trisodium phosphate, $Na_3PO_4$, is undesirable because of its adverse cross-linking characteristics which may actually deter absorption of water by the rice and prevent its gelatinization.

Chemicals believed to act principally to modify the protein structure of the rice by attenuation, disruption and/or disintegration are citrates, including magnesium citrate, sodium citrate, $Na_3C_6H_5O_7$, and calcium citrate, $Ca_3(C_6H_5O_7)_2.4H_2O$. Such citrates are not sufficiently effective alone to produce a desirable quick-cooking rice product in conjunction with heat treatment. Such a citrate should be used either with alkali metal phosphate as specified above or with calcium chloride, $CaCl_2$. Calcium chloride and alkali metal phosphate should not be used together in the heat treatment aqueous chemical, however, because they react with each other to prevent effective action of either to modify the rice protein. A beneficial effect of the calcium chloride is to reduce the temperature of heat treatment required in preparing the quick-cooking rice product. Calcium chloride provides the further benefit of serving as a desiccant to deter loss of moisture from rice grains and thus reduce weight loss of the rice during storage. For this purpose the calcium chloride can be supplied to rice grain either during a rinsing operation or a precooking operation or, by addition to rice grain which has not been treated to reduce its final cooking time, by mixing the calcium chloride with glucose and talc for coating the rice grains during the milling process.

Auxiliary chemicals having beneficial effects are fatty acid glycerides, i.e. glyceryl monostearate, monooleate, monopalmitate, distearate, dioleate, diplamitate, tristearate, trioleate or tripalmitate and silicones, which deter adhesion, and primary calcium phosphate, $CaH_4(PO_4)_2$, or secondary calcium phosphate, $CaHPO_4$, which facilitates absorption of water by the starch and enhances the whiteness of the rice product. Any or all of such auxiliary chemicals can be used in combination with alkali metal phosphate as specified above, or with an alkali metal phosphate and citrate combination, or with a citrate and calcium chloride combination.

The proportions by weight of the various chemicals as compared to the dry rice to be treated, usable in a rice-treating solution in which rice may be heated or which can be sprayed on rice to be heated, or which can be mixed with the rice, are as follows:

| Chemical | Range | Preferred |
| --- | --- | --- |
| Alkali metal phosphate | .001%–7% | 0.3% to 1.5% |
| Citrate | .001%–7% | 0.2% to 1.5% |
| Calcium chloride | .001%–7% | 0.3% to 1.5% |
| Fatty acid glyceride | .05%–9% | 0.5% to 1% |
| Silicones | .001%–5% | 0.3% to 1.5% |
| Calcium phosphate | .001%–5% | 0.1% to 0.8% |

Heat treatment is required for reaction between the chemicals and the rice to produce quick-cooking rice. The rice can be heated in an abundance of water containing the desired chemicals in solution for a period of 3 minutes to 60 minutes, depending upon the chemicals used and the concentration of the solution of the various chemicals. The treatment time should be increased if the rice is placed in cold water which must be brought to a boil. The processing time can be shortened by increasing the temperature of the water in the range of 212° F. up to as much as 280° F. by maintaining the heat-treating vessel under pressure.

An alternative type of heat treatment can be effected by subjecting the rice to steam. In such process ample chemical solution of the type described above is sprayed onto or mixed with the rice intermittently during the steaming process. The rice is then subjected to live steam at a temperature of 212° F. to 280° F. for a period of 5 minutes to 45 minutes. Again the time of heat treatment is dependent upon the amount of chemical solution used, the temperature of the steam, the concentration of the chemical solution, the duration of presoaking and the type of rice. A longer treatment time is required where the steam is at a lower temperature and/or the solutions are less concentrated.

A third type of treatment is torrefaction. For such treatment the rice is sprayed or mixed with a chemical solution of the type described above in the amount of 5 pounds to 50 pounds of solution per 100 pounds of rice or mixed with an equivalent amount of dry chemical powder. Such heating may be accomplished in an autoclave within a temperature range of 212° F. to 285°F. and under a pressure of 1 pound per square inch to 40 pounds per square inch.

Following the heat treatment the rice is rinsed to remove excess chemical solution and exudates and to eliminate clumping. The rinsing may be effected in calcium chloride brine for this purpose. The rice is then dried, such as by a steady current of warm air not exceeding about 160°F. or by intermittent blasts of hotter air. The resulting product will be ready to be packaged for sale as quick-cooking rice. The grains of such product will be unmutilated and strong. The rice will be approximately as white as the rice was before being subjected to the treatment, and the grains will be of generally the same size as the grains of the initial rice.

While the general type of rice treatment to produce quick-cooking rice has been described above, the following representative specific examples of such treatment have been found to be satisfactory.

EXAMPLE 1

Initial rinsing optional.
Treating chemical aqueous solution:
   Monosodium phosphate   0.75% by weight of the dry rice.
   Calcium citrate   0.5 % by weight of the dry rice.

Cook the rice in ample chemical solution under atmospheric or higher pressure at a temperature of 185°F. to 280°F. until the rice has been substantially completely cooked. Time required 1 minute to 50 minutes. At boiling the usual time required is about 17 minutes.

Rinse the rice in water to remove chemical residue and separate the grains.

Air dry the rice to a moisture content of 13% to 17%. The quick-cooking rice product can be cooked finally to a palatable state by boiling in water at atmospheric pressure for a period of 4 minutes to 8 minutes.

EXAMPLE 2

Same as Example 1 except that either during the step of boiling the rice in chemical solution or in the rinsing step after boiling calcium phosphate is provided to increase the ability of the rice to absorb water. If the calcium phosphate is provided in the rinse water, it should contain calcium phosphate in the proportion of a 0.001% to 0.5% by weight of the dry rice.

EXAMPLE 3

Same as Example 1 or Example 2, except that the chemical solution contains sodium citrate instead of calcium citrate in the proportion of 0.6% by weight of the dry rice.

EXAMPLE 4

Same as Example 1, Example 2 or Example 3, except that the chemical solution contains disodium phosphate instead of monosodium phosphate, in the proportion of 0.8% by weight of the dry rice.

EXAMPLE 5

Same as Example 1, Example 2, Example 3 or Example 4, except that after the cooking of the rice has been completed glyceryl monostearate or silicone is added to the solution in the proportion of 0.5% by weight of the dry rice to coat the rice grains to deter their adhesion to each other.

EXAMPLE 6

Rinse in water (80°F. to 85°F.) for 3 minutes to 5 minutes.
Treating chemical aqueous solution:
   Calcium chloride 0.75% by weight of the dry rice.
   Sodium citrate 0.5% by weight of the dry rice.
Boil the rice in the chemical solution under pressure at a temperature of 245°F. to 250°F. for a period of 10 minutes to 20 minutes.
Air dry the heat-treated rice to a moisture content of 13% to 17%.

The resulting quick-cooking rice product can be cooked finally to a palatable state by boiling in water at atmospheric pressure for a period of 5 minutes to 8 minutes.

EXAMPLE 7

Same as Example 6, except that the rice is boiled in the chemical solution at a temperature of 250°F. for a period of 20 minutes to 40 minutes.

The resulting quick-cooking rice product can be cooked finally to a palatable state by boiling in water at atmospheric pressure for a period of 3 minutes to 6 minutes.

EXAMPLE 8

Same as Example 6, except that, following boiling of the rice in the chemical solution at a temperature of 245°F. to 250°F. for a period of 15 minutes to 20 minutes, the rice is further boiled in water at atmospheric pressure at a temperature of 212°F. for a period of 3 minutes to 7 minutes.

The resulting quick-cooking rice product can be cooked finally to a palatable state by boiling in water at atmospheric pressure for a period of 2 minutes to 5 minutes.

EXAMPLE 9

Rinse for 3 minutes to 5 minutes in water at a temperature of 80°F. to 85°F.
Treating chemical aqueous solution:
   Monosodium phosphate 0.75% by weight of the dry rice.
Boil the rice in the chemical solution under pressure at a temperature of 250°F. for 30 minutes.
Boil in water at atmospheric pressure at a temperature of 212°F. for a period of 3 minutes to 12 minutes until the grains have been approximately 75% cooked.
Air dry the heat-treated rice to a moisture content of 13% to 17%.

The resulting quick-cooking rice product can be cooked finally to a palatable state by boiling in water at atmospheric pressure for a period of 4 minutes to 7 minutes.

EXAMPLE 10

Initial rinsing optional.
Treating chemical aqueous solution:
   Disodium phosphate   0.75% by weight of the dry rice.
   Glyceryl monostearate   0.5 % by weight of the dry rice.

Spray from 15 pounds to 75 pounds of the chemical solution onto the rice for each 100 pounds of rice and project live steam onto the rice on a continuous belt for a period of 3 minutes to 5 minutes at a temperature of approximately 212°F.

Rinse in warm water.

Spray onto the rice 15 pounds to 30 pounds of the chemical solution for each 100 pounds of rice and steam the rice at a temperature of approximately 212°F. for a period of 3 minutes to 5 minutes.

Rinse as above.

Spray onto the rice from 15 pounds to 30 pounds of water per 100 pounds of rice and steam the rice at a temperature of approximately 212°F. for a period of 3 minutes to 5 minutes.

Rinse in water at a temperature of 35°F to 50° F.

Air dry to a moisture content of 13% to 17% moisture.

The resulting quick-cooking rice product can be cooked finally to a palatable state by boiling in water at atmospheric pressure for a period of 3 minutes to 8 minutes.

EXAMPLE 11

Initial rinsing optional.

Treating chemical aqueous solution or dry chemical:
Disodium phosphate 0.75% by weight of the dry rice.

Permeate the rice with the chemical solution until thoroughly surface-coated, or mix with dry chemical and spray lightly with water.

Roast in pressure cooker at a temperature of 165°F to a temperature of 285°F., preferably at an average temperature of 240° F. to 250° F., for a period of 50 minutes to 70 minutes.

Spray or rinse in warm water.

Dry to a moisture content of 13% to 17% by weight.

The resulting quick-cooking rice product can be cooked finally to a palatable state by boiling in water at atmospheric pressure of a period of 3 minutes to 8 minutes.

The various processes described are generally suitable for long grain rice, short grain rice, pearl rice or brown rice, except that steam cooking is not preferred for treating short grain rice or pearl rice. In the examples given above the amount of chemicals specified and the times of treatment apply to the processing of long grain rice. For processing natural or brown rice the concentration of the various chemicals should be approximately twice as great as used for long grain rice and the cooking times should be extended to approximately three times as long. For treating short grain rice or pearl rice the proportion of chemicals used in the treating liquid can be approximately the same as for treating long grain rice, except taht approximately twice as much alkali metal phosphate should be used as for treating long grain rice and the treating time should be approximately two-thirds as great as for treating long grain rice.

Generally it is immaterial to what extent the original rice expands during preparation of the quick-cooking rice or how much of the expansion is retained following the drying step. The important consideration is that the rice protein and/or starch components be modified by the chemical and heating treatment so that during the final cooking operation the rice will imbibe water quickly and be expanded fully to yield a product having an appearance, odor, texture and taste substantially comparable to conventionally milled rice which has been cooked competently.

Since quick-cooking rice prepared in accordance with the processes described above can be cooked finally by the consumer by being heated in water for a period of 2 minutes to 8 minutes, depending upon the particular process used, such rice can be coated with any of a variety of coatings prior to being marketed to make special rice dishes. Such coatings may, for example, be used to produce rice with cheese sauce, Spanish rice, curried rice, Italian rice, Chinese rice, rice pudding or rice with butter-type sauce.

Such coatings may have the following ingredients in the proportions given by weight:

| Ingredients | Range | Preferred |
|---|---|---|
| Fatty acid glyceride base | 1% to 25% | 10% |
| Powdered whey | 1% to 15% | 5% to 10% |
| Characterizing ingredients | 60% to 95% | 60% to 80% |

Preservatives can be added as needed. The type of characterizing ingredients will depend upon the type of coating desired.

In preparing the coating, which may be any of those previously listed above, the fat base, i.e. the fatty acid glyceride, which is solid at ordinary temperatures, is heated until it is melted. In some instances the rice is mixed into the melted fatty acid glyceride until it has been coated with the fat base. The other ingredients of the sauce are then mixed together in powdered form and the rice is stirred with the powder which adheres to the rice grains coated with the melted fatty acid glyceride. In other instances the dry ingredients of the coating can be mixed with the melted fatty acid glyceride and the uncoated dry rice is then stirred into and mixed with the total coating preparation. The coated rice grains are then cooled quickly to room temperature so that the fat in the coating becomes solid again. The proportion of coating preparation to rice may be within the range of 1 pound to 10 pounds of coating per 100 pounds of dry rice.

For cheese coating the characterizing ingredients can be powdered cheese, powdered milk and cooking fat. These ingredients can, for example, be provided in equal proportions by weight, such as each of the characterizing ingredients being 25% by weight of the coating mixture. In this instance the cooking fat is melted with the fatty acid glyceride, and the powdered spices, whey, cheese and milk are mixed into the liquid fat before the rice is mixed with the coating material.

For preparing Spanish rice the characterizing ingredients can include, for example, by weight: tomato powder 50%, comminuted peppers (red and green) 13%, and citric acid powder 2%. In this instance the rice is first mixed into the melted fatty acid glyceride until it has been coated. The dry ingredients of the coating are mixed together and the rice is stirred with the dry mixture which adheres to the rice grains coated with the melted fatty acid glyceride.

For curried rice the characterizing ingredients may include, for example, by weight: curry powder 20%, onion powder or flakes 15%, parsley flakes 7%, powdered starch 10%, cooking fat 20%, chicken or beef extracts or hydrolized plant proteins 15%. The cooking fat is melted with the fatty acid glyceride, and the other ingredients of the coating are mixed into the liquid fat before the rice is mixed with the coating material.

For Italian rice the characterizing ingredients may include, for example, by weight: powdered Romano or parmesan cheese 15%, tomato powder 45%, caramel 5%, oregano flakes 3%, thyme flakes or powder 2%, sweet basil flakes 3%, garlic powder 1%, onion flakes or powder 5%, citric acid 1%. In this instance the rice is first mixed into the melted fatty acid glyceride until it has been coated. The dry ingredients of the coating are mixed together and the rice is stirred with the dry mixture which adheres to the rice grains coated with the melted fatty acid glyceride.

For Chinese rice the characterizing ingredients may include, for example, by weight: monosodium glutamate powder 2%, onion powder or flakes 7%, cumin powder 6%, beef extract or yeast hydrolysate 22%, powdered mushrooms 16%, garlic powder 2%, citric acid powder 1%, celery salt 5%. The rice is first mixed into the melted fatty acid glyceride until it has been coated. The dry ingredients of the coating are mixed together and the rice is stirred with the dry mixture which adheres to the rice grains coated with the melted fatty acid glyceride.

For rice pudding the characterizing ingredients may be, for example, by weight: powdered custard mix 20%, caramel 16%, spices 4%, raisins 3%, pudding starch powder 30%, vanilla, cinnamon and/or fruit flavoring 3%, powdered milk 4%. The rice is mixed into the melted fatty acid glyceride and liquid ingredients until it has been coated. The dry ingredients of the coating are mixed together and the rice is stirred with the dry mixture which adheres to the rice grains coated with the melted fatty acid glyceride and liquid ingredients.

For the cooked rice to be in a butter-type sauce the following characterizing ingredients can be included, for example, by weight: cooking fat, e.g. butter, 40%, pudding starch powder 15%, powdered milk 15%, diacetyl .05%. The cooking fat is melted with the fatty acid glyceride and the powdered ingredients are mixed into the liquid fat before the rice is mixed with the coating material.

To provide a combination of rice and an alimentary paste product such as macaroni, spaghetti, vermicelli or noodles, the following characterizing ingredients may be used, for example, by weight: chopped or short-length paste product 50% and powdered beef or chicken extracts 10%. The rice is first mixed into the melted fatty acid glyceride until it has been coated. The dry ingredients of the coating are mixed together and the rice is stirred with the dry mixture, the powdered portions of which adhere to the rice grains coated with the melted fatty acid glyceride.

Alternatively, a marketable product is composed of quick-cooking rice alone mixed with a chopped or short-length alimentary paste product without additional ingredients in proportions, by weight, within the range of 20% to 80% of either component. Preferably the rice and paste product should be in approximately equal proportions by weight.

A chili-rice dish can be provided by use of the following characterizing ingredients, for example, by weight: hydrolized plant protein up to 20%, beef extract up to 10%, spun soya protein chunks 30%, dry beans or bean powder 20%, tomato powder up to 20%, onion powder 1%, chili powder 2%. The rice is first mixed into the melted fatty acid glyceride until it has been coated. The dry ingredients of the coating are mixed together, and the rice is stirred with the dry mixture so that the powder adheres to the rice grains coated with the melted fatty acid glyceride.

To make dressing the following characterizing ingredients may be used, for example, by weight: bread crumbs or chunks or both up to 50%, sage powder 2%, celery salt 2%, onion salt 2%, monosodium glutamate 2%, comminuted mushrooms 10%, cooking fat 10%. The cooking fat is melted with the fatty acid glyceride and the powdered dry material is mixed into the liquid fat before the rice is mixed with the coating material. The coating material, bread and rice are then mixed together.

The coated rice products and the mixture of rice with other components described above will all be in dry form and may be packaged in cardboard boxes. No special technique is required for preserving their shelf life for reasonable periods of time. In preparing the rice dish it is merely necessary to cook the coated rice or rice combination mixture for the same period of time and in the same manner in hot water as would be required for cooking the rice alone.

We claim:

1. The method of preparing a quick-cooking rice product consisting essentially in the steps of increasing the water absorptivity of rice by heating rice to a temperature within the range of 185° F. to 280° F. at a pressure at least as great as atmospheric pressure for a period of 2 minutes to 70 minutes and simultaneously treating such rice with aqueous chemical solution consisting of alkali metal phosphate, excluding trisodium phosphate, said solution containing said alkali metal phosphate in the proportion of 0.001% to 7% by weight of the dry rice to be treated, and thereafter drying the rice.

2. The method defined in claim 1, including rinsing rice in a mildly alkaline solution prior to the application to it of the aqueous chemical solution.

3. The method defined in claim 1, including heating the rice in ample aqueous chemical solution.

4. The method defined in claim 1, including heating the rice and aqueous chemical solution in an atmosphere of live steam.

5. The method defined in claim 1, including heating the rice and aqueous chemical solution by torrefaction.

6. The method defined in claim 1, including rinsing the rice following the heating step to remove aqueous chemical solution residue and to deter clumping.

7. The method defined in claim 1, including rinsing the rice in calcium chloride brine following the heating step to remove aqueous chemical solution residue and to deter clumping.

8. The method defined in claim 1, in which the aqueous chemical solution includes calcium phosphate in the proportion of up to 5% by weight of the dry rice.

9. The method defined in claim 1, in which the aqueous chemical solution contains, in the proportion of 0.001% to 7% by weight of the dry rice to be treated, at least one citrate selected from the group consisting of sodium citrate, calcium citrate and magnesium citrate.

10. The method defined in claim 9, in which the citrate is sodium citrate.

11. The method defined in claim 9, in which the citrate is calcium citrate.

12. The method defined in claim 9, in which the citrate is magnesium citrate.

13. The method of preparing a quick-cooking rice product consisting essentially in the steps of increasing the water absorptivity of rice by heating rice to a temperature within the range of 185° to 280° F. at a pressure at least as great as atmospheric pressure for a period of 2 minutes to 70 minutes and simultaneously treating such rice with aqueous solution of calcium chloride in the proportion of 0.001% to 7% by weight of the dry rice to be treated and, in the proportion of .001% to 7% by weight of the dry rice to be treated, of at least one citrate selected from the group consisting of sodium citrate, calcium citrate and magnesium citrate, and thereafter drying the rice.

14. The method of preparing quick-cooking rice which comprises heating rice to a temperature within the range of 185° F. to 280° F. for a period of 2 minutes to 70 minutes while being treated with aqueous chemical solution containing, a. in the proportion of 0.001% to 7% by weight of the dry rice, at least one citrate selected from the group consisting of sodium citrate, calcium citrate and magnesium citrate, and, b. in the proportion of 0.001% to 7% by weight of the dry rice, calcium chloride or alkali metal phosphate, excluding trisodium phosphate, and thereafter drying the rice.

15. The method defined in claim 13, in which the citrate is sodium citrate.

16. The method defined in claim 13, in which the citrate is calcium citrate.

17. The method defined in claim 13, in which the citrate is magnesium citrate.

18. A method for producing a cooked rice product which comprises applying to the dried rice grains resulting from the process defined in claim 1 a fat base coating which is solid at ordinary temperatures, and cooking the coated rice in the presence of moisture until the rice and coating material are cooked to a palatable state.

19. A method for producing a cooked rice product which comprises applying to the dried rice grains resulting from the process defined in claim 13 a fat base coating which is solid at ordinary temperatures, and cooking the coated rice in the presence of moisture until the rice and coating material are cooked to a palatable state.

* * * * *